US012748956B2

(12) United States Patent
Patanakar et al.

(10) Patent No.: US 12,748,956 B2
(45) Date of Patent: Sep. 29, 2026

(54) ENHANCING THE QUALITY OF SIMULATED NETWORK DATA USING GENERATIVE ADVERSARIAL NETWORKS

(71) Applicant: Juniper Networks, Inc., Sunnyvale, CA (US)

(72) Inventors: Ajit Krishna Patankar, Fremont, CA (US); Aman Gaurav, Lucknow (IN); Harshavardhan V S Choudary Battula, Saint Paul, MN (US); Yash Verma, Agra (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 644 days.

(21) Appl. No.: 18/333,063

(22) Filed: Jun. 12, 2023

(65) Prior Publication Data

US 2024/0412047 A1 Dec. 12, 2024

(51) Int. Cl.
*G06F 16/00* (2019.01)
*G06N 3/044* (2023.01)
(Continued)

(52) U.S. Cl.
CPC ........... *G06N 3/0475* (2023.01); *G06N 3/044* (2023.01); *G06N 3/045* (2023.01); *G06N 3/094* (2023.01)

(58) Field of Classification Search
CPC ........ G06N 3/045; G06N 3/09; G06N 3/0464; G06N 3/0475; G06N 3/08; G06N 3/094;
(Continued)

(56) References Cited

U.S. PATENT DOCUMENTS 10,702,169 B2 7/2020 Gaurav et al.
11,893,056 B2 * 2/2024 Kontkanen ............ G06N 3/045
(Continued)

FOREIGN PATENT DOCUMENTS

EP 3982298 A1 4/2022

OTHER PUBLICATIONS

Extended European Search Report for Application No. EP23190299 mailed on Feb. 2, 2024, 11 pages.
(Continued)

*Primary Examiner* — Shyue Jiunn Hwa
(74) *Attorney, Agent, or Firm* — Harrity & Harrity, LLP

(57) ABSTRACT

A device may receive real network data associated with a network, and may receive a random latent vector and a random process sample. The device may utilize the random latent vector with a generative adversarial network (GAN) model to generate synthetic network data, and may train the GAN model with the real network data and the synthetic network data to generate a trained GAN model. The device may utilize the random process sample with a random process to generate simulated network data, and may apply weights to the real network data, the synthetic network data, and the simulated network data to generate weighted real network data, weighted synthetic network data, and weighted simulated network data. The device may combine the weighted real network data, the weighted synthetic network data, and the weighted simulated network data to generate interpolated network data, and may perform actions based on the interpolated network data.

20 Claims, 13 Drawing Sheets

(51) Int. Cl.

| | |
|---|---|
| ***G06N 3/045*** | (2023.01) |
| ***G06N 3/0475*** | (2023.01) |
| ***G06N 3/094*** | (2023.01) |

(58) Field of Classification Search

CPC ...... G06N 3/0455; G06N 20/00; G06N 3/047; G06N 3/0985; G06N 3/0442; G06N 3/092; G06N 3/082; G06N 3/044; G06N 3/088; G06N 3/096; G06N 5/01; G06N 7/01; G06N 3/084; G06N 3/098; G06N 3/105; G06N 20/10; G06N 20/20; G06N 3/006; C12Q 1/6806; C12Q 1/6827; C12Q 1/6855; C12Q 1/6886; C12Q 2525/179; C12Q 2525/191; C12Q 2535/122; C12Q 2537/159; C12Q 2537/165; C12Q 2563/131; C12Q 2563/179; C12Q 2600/156

See application file for complete search history.

(56) References Cited

U.S. PATENT DOCUMENTS

| | | | | |
|---|---|---|---|---|
| 2019/0139641 | A1* | 5/2019 | Itu | G16H 30/20 |
| 2020/0311482 | A1* | 10/2020 | Soni | G06V 10/82 |
| 2021/0037044 | A1 | 2/2021 | Achanta et al. | |
| 2022/0172050 | A1* | 6/2022 | Dalli | G06N 3/0495 |
| 2023/0155704 | A1 | 5/2023 | Orekondy et al. | |
| 2024/0119199 | A1* | 4/2024 | Balasubramanian | G06N 3/0475 |
| 2025/0078216 | A1* | 3/2025 | Van Aert | G06T 5/70 |

OTHER PUBLICATIONS

Arjovsky M. et al., Wasserstein Generative Adversarial Networks, ICML'17: Proceedings of the 34th International Conference on Machine Learning, Aug. 6, 2017, 214-223 pages, vol. 70, ACM.

Bengio et al., Scheduled Sampling for Sequence Prediction with Recurrent Neural Networks, NIPS'15: Proceedings of the 28th International Conference on Neural Information Processing Systems, Dec. 7, 2015, 1171-1179 pages, vol. 1, ACM, Mountain View, CA, USA.

Hyland et al., Real-Valued (Medical) Time Series Generation with Recurrent Conditional GANS, CoRR, Jun. 8, 2017, 01-11 Pages, University of Stuttgart, Zurich, Switzerland.

Gaurav A. et al., Cuff-Less ppg Based Continuous Blood Pressure Monitoring—A Smartphone Based Approach, 38th Annual International Conference of the IEEE Engineering in Medicine and Biology Society (EMBC), Aug. 1, 2016, 607-610 pages, IEEE, Orlando, USA.

Goodfellow I. et al., Generative Adversarial Networks, NIPS'14: Proceedings of the 27th International Conference on Neural Information Processing Systems, Dec. 8, 2014, 2672-2680 pages, vol. 2, ACM, Montreal, Canada.

Gulrajani I. et al., Improved Training of Wasserstein Gans, NIPS'17: Proceedings of the 31st International Conference on Neural Information Processing Systems, Dec. 4, 2017, 5769-5779 pages, ACM.

Lin Z. et al., Using Gans for Sharing Networked Time Series Data: Challenges, Initial Promise, And Open Questions., IMC '20: ACM Internet Measurement Conference, Oct. 27, 2020, 464-483 pages, vol. 70, ACM, Virtual Event USA.

Maheedhar M. et al., Stayfit: A Wearable Application for Gym Based Power Training, 38th Annual International Conference of the IEEE Engineering in Medicine and Biology Society (EMBC), Aug. 16-20, 2016, 6290-6293 pages, IEEE, Orlando, FL, USA.

Mogren et al., C-RNN-GAN:Continuous Recurrent Neural Networks With Adversarial Training, Constructive Machine Learning Workshop (CML) at NIPS 2016, Nov. 29, 2016, Barcelona, Sweden.

Pei H. et al., Towards Generating Real-World Time Series Data, 21th IEEE International Conference on Data Mining (ICDM 2021), Dec. 7-10, 2021, 469-478 pages, IEEE.

Smith et al., Conditional Gan for Timeseries Generation, Jul. 1, 2020.

Smith et al., Time Series Generation Using a One Dimensional Wasserstein Gan, ITISE 2019: International Conference on Time Series and Forecasting, Sep. 25-27, 2019, 771-781 pages, vol. 52, Issue No. 22, Granada, Spain.

Van den Oord A. et al., Pixel Recurrent Neural Networks, ICML'16: Proceedings of the 33rd International Conference on International Conference on Machine Learning, Jun. 19, 2016, 1747-1756 pages, vol. 48, ACM.

Wiese M. et al., Quant GANs: Deep Generation of Financial Time Series, Quantitative Finance, Apr. 6, 2020, 1419-1440 pages, vol. 20, Issue No. 9, Taylor & Francis Online.

Xu T. et al., Cot-Gan: Generating Sequential Data via Causal Optimal Transport, NIPS'20: Proceedings of the 34th International Conference on Neural Information Processing Systems, Dec. 6, 2020, 8798-8809 pages, Article No. 738, ACM.

Yoon J. et al., Time-Series Generative Adversarial Networks, NIPS'19: Proceedings of the 33rd International Conference on Neural Information Processing Systems, Dec. 8, 2019, 5508-5518 pages, Article No. 494, ACM, Los Angeles, USA.

* cited by examiner

100

ENHANCING THE QUALITY OF SIMULATED NETWORK DATA USING GENERATIVE ADVERSARIAL NETWORKS

BACKGROUND

Machine learning models have become an integral part of computer network and cloud management systems. For example, machine learning models may be utilized to monitor and/or control a computer network and/or a cloud management system.

SUMMARY

Some implementations described herein relate to a method. The method may include receiving real network data associated with a network, and receiving a random latent vector and a random process sample. The method may include utilizing the random latent vector with a generative adversarial network (GAN) model to generate synthetic network data, and training the GAN model with the real network data and the synthetic network data to generate a trained GAN model. The method may include utilizing the random process sample with a random process to generate simulated network data, and applying weights to the real network data, the synthetic network data, and the simulated network data to generate weighted real network data, weighted synthetic network data, and weighted simulated network data. The method may include combining the weighted real network data, the weighted synthetic network data, and the weighted simulated network data to generate interpolated network data, and performing one or more actions based on the interpolated network data.

Some implementations described herein relate to a device. The device may include one or more memories and one or more processors. The one or more processors may be configured to receive real network data associated with a network, wherein the real network data include a multivariate dataset, and to receive a random latent vector and a random process sample. The one or more processors may be configured to utilize the random latent vector with GAN model to generate synthetic network data, and train the GAN model with the real network data and the synthetic network data to generate a trained GAN model. The one or more processors may be configured to utilize the random process sample with a random process to generate simulated network data, and apply weights to the real network data, the synthetic network data, and the simulated network data to generate weighted real network data, weighted synthetic network data, and weighted simulated network data. The one or more processors may be configured to combine the weighted real network data, the weighted synthetic network data, and the weighted simulated network data to generate interpolated network data, and perform one or more actions based on the interpolated network data.

Some implementations described herein relate to a non-transitory computer-readable medium that stores a set of instructions. The set of instructions, when executed by one or more processors of a device, may cause the device to receive real network data associated with a network, and receive a random latent vector and a random process sample. The set of instructions, when executed by one or more processors of the device, may cause the device to utilize the random latent vector with a GAN model to generate synthetic network data, wherein the GAN model is a Wasserstein recurrent GAN model, and train the GAN model with the real network data and the synthetic network data to generate a trained GAN model. The set of instructions, when executed by one or more processors of the device, may cause the device to utilize the random process sample with a random process to generate simulated network data, and apply weights to the real network data, the synthetic network data, and the simulated network data to generate weighted real network data, weighted synthetic network data, and weighted simulated network data. The set of instructions, when executed by one or more processors of the device, may cause the device to combine the weighted real network data, the weighted synthetic network data, and the weighted simulated network data to generate interpolated network data, and perform one or more actions based on the interpolated network data.

DETAILED DESCRIPTION

Figure 1A:
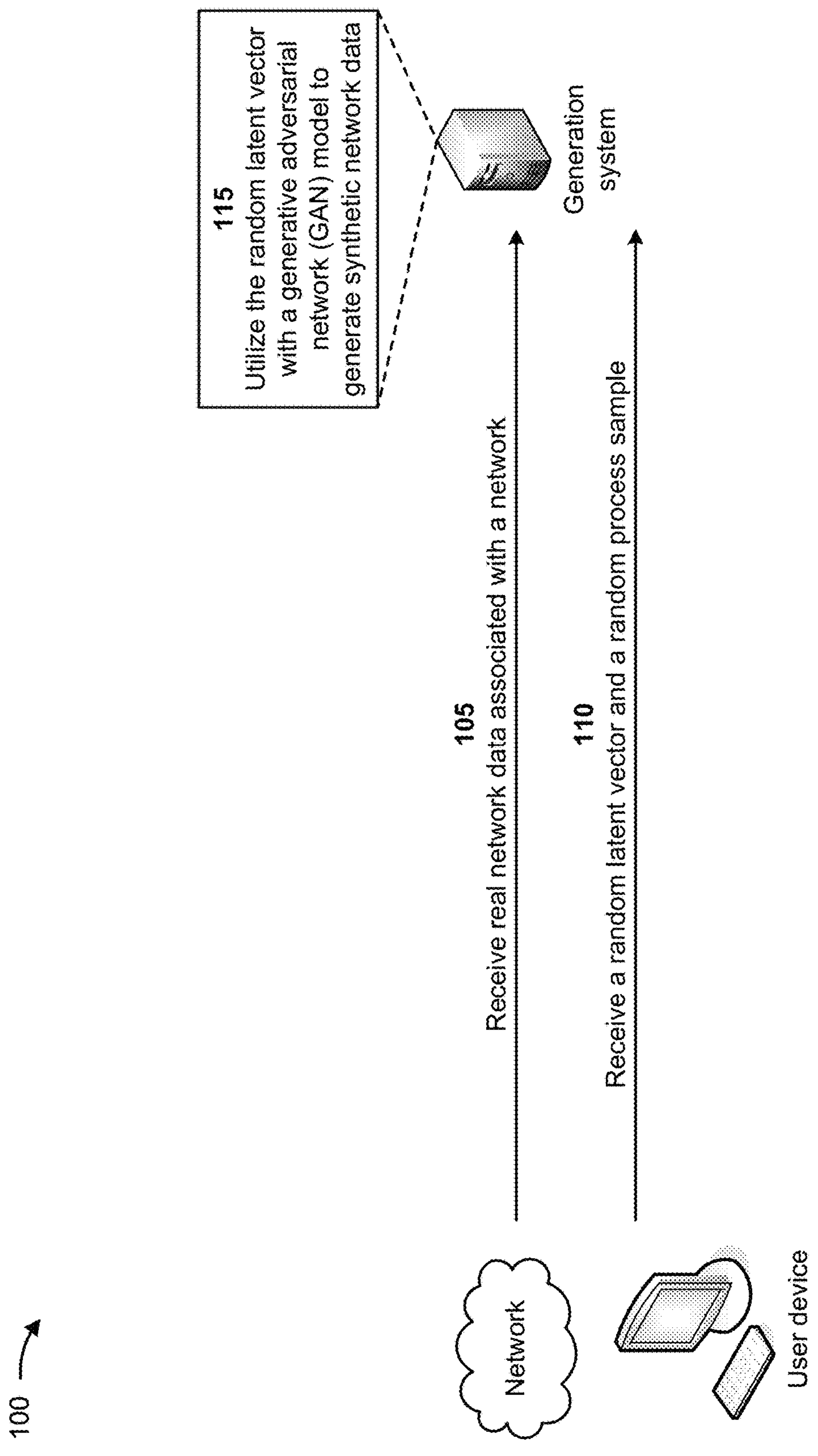
FIGS. 1A-1I are diagrams of an example associated with enhancing the quality of simulated network data using generative adversarial networks.

The following detailed description of example implementations refers to the accompanying drawings. The same reference numbers in different drawings may identify the same or similar elements.

Traditional rule based or statistical models lack capacity to model multi-variate temporal behavior of network traffic throughput. In such cases, machine learning models may be utilized to capture complex patterns and assist with monitoring and control functionality. However, the usefulness of machine learning models is lessened due to lack of availability of training data and lack of quality training data. Collecting data from physical networks is very costly or sometimes impossible. This problem is particularly exacerbated in network and cloud systems due to factors such as dynamic configurations, tail events, frequent introduction of new technologies, and/or the like. Obtaining quality training data for machine learning models may be more important than developing machine learning models that satisfy specific metrics. Thus, current techniques for training machine learning models consume computing resources (e.g., processing resources, memory resources, communication resources, and/or the like), networking resources, and/or other resources associated with failing to generate sufficient or quality training data for the machine learning models, failing to utilize insufficient training data to train the machine learning models, generating erroneous machine learning models based on the insufficient training data, generating erroneous outputs with the erroneous machine learning models, and/or the like.

Some implementations described herein relate to a generation system that enhances the quality of simulated network data using generative adversarial networks. For example, the generation system may receive real network data associated with a network, and may receive a random latent vector and a random process (e.g., a Poisson) sample. The generation system may utilize the random latent vector with a GAN model to generate synthetic network data, and may train the GAN model with the real network data and the synthetic network data to generate a trained GAN model and weights. The generation system may utilize the random process sample with a random process to generate simulated network data, and may apply the weights to the real network data, the synthetic network data, and the simulated network data to generate weighted real network data, weighted synthetic network data, and weighted simulated network data. The generation system may combine the weighted real network data, the weighted synthetic network data, and the weighted simulated network data to generate interpolated network data, and may perform one or more actions based on the interpolated network data.

In this way, the generation system enhances the quality of simulated network data using generative adversarial networks. For example, the generation system may utilize GANs to augment real telemetry data collected from networks. The generation system may create a simulated rule-based time series dataset that matches an expected data distribution using a random process (e.g., a Poisson process for network data). The generation system may design and train a Wasserstein recurrent GAN for a multi-variate dataset (e.g., network data), with learned weights from pre-training on individual features which emulate respective feature temporal distributions and prevent mode collapse, on limited real network data to capture an underlying pattern. The generation system may design a training methodology for continuous, multivariate, streaming data generation which trains faster and converges better than existing models. The generation system may generate an interpolated dataset based on the real network data, simulated network data that captures a general trend of the real network data, and synthetic network data that provides high fidelity. Thus, the generation system may conserve computing resources, networking resources, and/or other resources that would have otherwise been consumed by failing to generate sufficient or quality training data for the machine learning models, utilizing insufficient training data to train the machine learning models, generating erroneous machine learning models based on the insufficient training data, generating erroneous outputs with the erroneous machine learning models, and/or the like.

Although implementations described herein relate to GAN models, the implementations may be utilized with any type of gated neural network models, such as long short-term memory (LSTM) models, gated recurrent unit (GRU) models, and/or the like. For example, the weight transfer process from a univariate GAM model to a multivariate GAN model, described herein, may be utilized with any type of gated neural network models.

FIGS. 1A-1I are diagrams of an example 100 associated with enhancing the quality of simulated network data using generative adversarial networks. As shown in FIGS. 1A-1I, example 100 includes a generation system associated with a network and a user device. The generation system may include a system that enhances the quality of simulated network data using generative adversarial networks. The network may include a cellular network, such as a fifth generation (5G) network, a fourth generation (4G) network, a long-term evolution (LTE) network, a third generation (3G) network, a code division multiple access (CDMA) network, and/or the like. The user device may include a wireless communication device, a mobile phone, a user equipment, a laptop computer, a tablet computer, a desktop computer, and/or the like. Further details of the generation system, the network, and the user device are provided elsewhere herein.

As shown in FIG. 1A, and by reference number 105, the generation system may receive real network data associated with a network. For example, the network may include one or more network devices (e.g., base stations, switches, routers, gateways, multi-access edge computing (MEC) devices, and/or the like) that generate network data associated with operation of the network. The network data may include time series data with multivariate temporal behavior, such as traffic throughput, bandwidth, traffic demand, and/or the like. In some implementations, the generation system may continuously receive the real network data in real time or in near real time from the network, may periodically receive the real network data from the network, may receive the real network data from the network based on requesting the real network data from the network, and/or the like. In some implementations, the generation system may store the real network data in a data structure (e.g., a database, a table, a list, and/or the like) associated with the generation system.

As further shown in FIG. 1A, and by reference number 110, the generation system may receive a random latent vector and a random process (e.g., a Poisson) sample. For example, the generation system may determine the random latent vector and the random process sample. Alternatively, a user of the user device may cause the user device to provide the random latent vector and the random process sample to the generation system. The generation system may receive the random latent vector and the random process sample from the user device. In some implementations, the random latent vector may include a random noise vector that the generation system utilizes to generate synthetic network data, as described below. The random process sample may include a random process variable that the generation system utilizes to generate simulated network data, as described below.

Figure 1B:
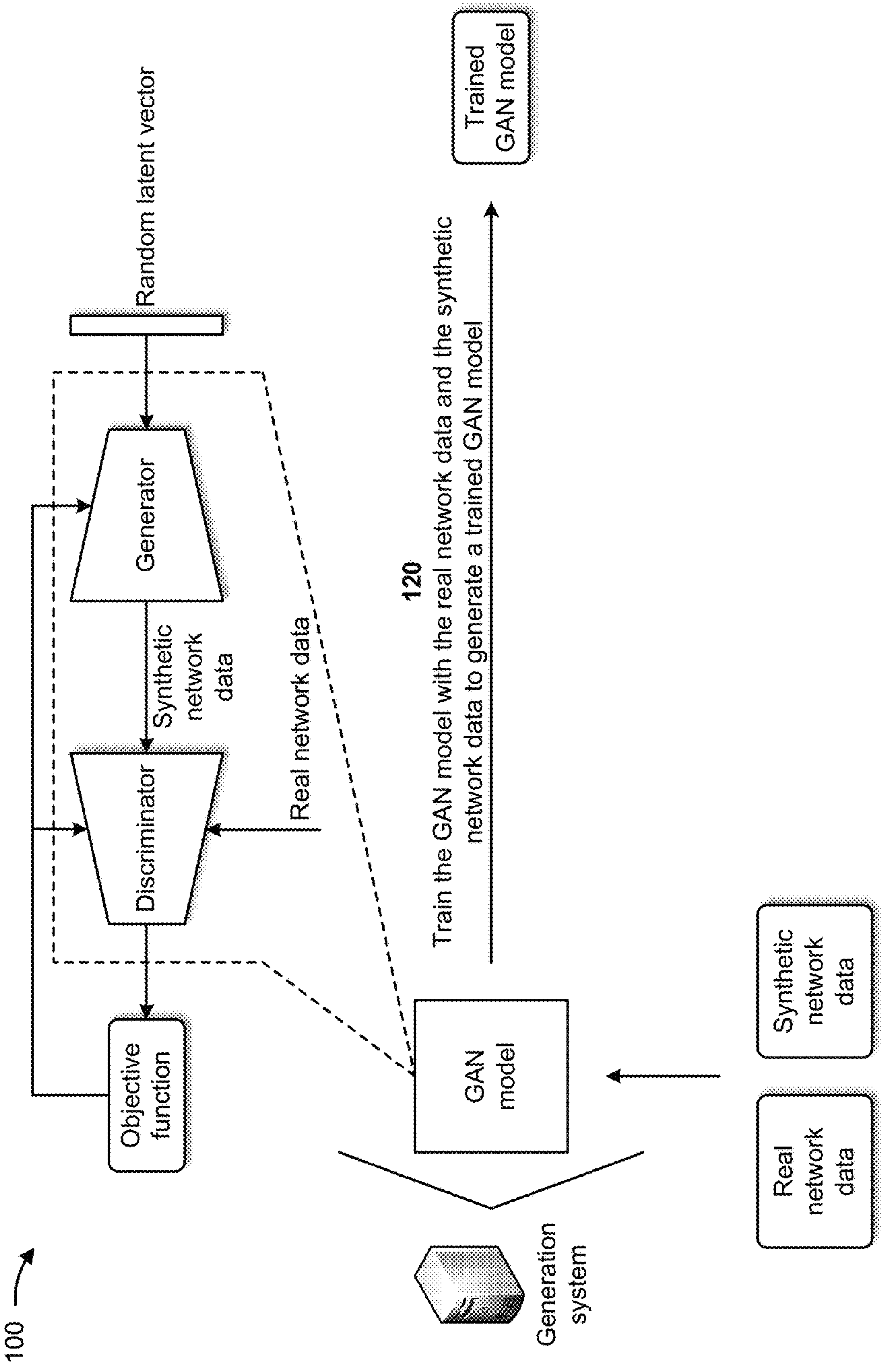

As further shown in FIG. 1A, and by reference number 115, the generation system may utilize the random latent vector with a GAN model to generate synthetic network data. For example, the generation system may include the GAN model. The GAN model may include a generator component and a discriminator component (e.g., as shown in FIG. 1B). A regular GAN model is prone to problems, such as vanishing gradient and mode collapse due to stability of the discriminator component during a training process. To address this problem, a Wasserstein GAN model may replace a standard binary cross entropy objective function with an earth mover's distance. Another version of Wasserstein GAN model adds a gradient penalty term as regularization to improve the stability of the discriminator component. Equation 1 below represents a loss of the generator component, which is an expected value of predictions from the discriminator component on synthetic samples. Equation 2 represents a loss of the discriminator component and a Wasserstein distance between the expected values of discriminator component from synthetic samples and real samples, along with a gradient penalty term. Equation 3 represents a computation of the gradient penalty term maintaining 1-L continuity by constraining a maximum norm of the gradient to one. A loss function of the discriminator component may be modified, to ensure that a difference between an expected score does not drastically increase, by adding a regularizing term according to the Equation 4.

$$L_G = -E_{\tilde{x}\sim p_g}|D(\tilde{x})| \tag{1}$$

$$L_D = E_{\tilde{x}\sim p_g}|D(\tilde{x})| - E_{x\sim p_d}|D(x)| + GP \tag{2}$$

$$GP = \lambda E_{\tilde{x}\sim p_g}\left[\left(\|\nabla D(\alpha x + (1-\alpha\tilde{x}))\|_2 - 1\right)^2\right] \tag{3}$$

$$mL_D = E_{\tilde{x}\sim p_g}|D(\tilde{x})| - E_{x\sim p_d}|D(x)| + GP + \rho\left(\left(E_{\tilde{x}\sim p_g}|D(\tilde{x})|\right)^2 + \left(E_{x\sim p_d}|D(x)|\right)^2\right) \tag{4}$$

The gradient penalty may be calculated on an interpolated series, which is a weighted combination of a real series (x) and a synthetic series (x̃).

In some implementations, the GAN model may include a simple recurrent GAN (RGAN) with a Wasserstein distance and a gradient penalty (e.g., WRGAN-GP) for time series generation. By utilizing Wasserstein loss with the gradient penalty as a loss function, the GAN model may prevent problems such as mode collapse, while still generating data with sufficient fidelity, diversity, and usefulness.

In some implementations, the generator component (G) and the discriminator component (D) (e.g., see FIG. 1B) may be long short-term memory (LSTM) based to process sequences. The generator component may return a window of a synthetic sequence (f) (e.g., the synthetic network data) based on the random latent vector (z) and hidden states (h, c). At a time (t), a series of real network data $x(t)\in R^{w\times d}$ may be defined, based on a sliding window of size (w) of data (d), over a historical time series data for training. An LSTM cell of the generator component may utilize the random latent vector (z) as a sequence, along with the hidden states (h, c), to predict a series window ($f_t$), as shown in Equations 5 and 6.

$$\tilde{y} = LSTM(z, (h, c)) \tag{5}$$

$$f_t = ReLU(\tilde{y}) \tag{6}$$

A size of the random latent vector (z) may be a hyperparameter. As the value of the random latent vector (z) increases, a more deterministic mapping may be provided. The discriminator component may utilize real network data (x) or synthetic network data (%) to determine distinctions.

As shown in FIG. 1B, and by reference number 120, the generation system may train the GAN model with the real network data and the synthetic network data to generate a trained GAN model. For example, the generation system may train the GAN model for each feature of the real network data and the synthetic network data. In some implementations, the generation system may train n different univariate models for n-feature input data provided by gates of an LSTM cell (e.g., an input gate (i), an output gate (o), and a forget gate (f)). Internally the LSTM cell may concatenate weights associated with the different gates into a matrix while training the gates. The input data may be split into block matrices to show transfer of the weights. The input gate may be associated with two weight matrices or four layers. A first column of the block matrices may be weight matrices of the LSTM cell associated with an input vector, and a second column of block matrices may represent weight matrices associated with a hidden vector. The univariate models have learned temporal dynamics of a feature on which the univariate models are trained. However, n-generators may not be synced and their phases may not align to incorporate a cross-correlation among multiple features. In order to reinforce training a multivariate model with a generator component and a discriminator component associated with weights, the learned weights of the individual models and cross-correlation weights may be randomly assigned to be trained in later epochs.

In a first layer (e.g., a layer with weights associated with the forget gate), weight matrices of the forget gate from the LSTM cell in the n different univariate models may be placed diagonally, and remaining entries may be set to zeros and may be associated with cross-correlation (e.g., learned later in training). The remaining layers may be similarly generated. An input vector may be formed from a concatenation of an input vector provided to the n-univariate models. Input vectors ${}_mH_{in}=n*H_{in}$ and ${}_mH_{cell}=n*H_{cell}$ may be true for successful weights transfer, where n is a quantity of features in a dataset. Such a transfer of weights may further the training process, may make the GAN model robust, and may prevent mode collapse.

In some implementations, the generation system may train the GAN model, with the real network data and the synthetic network data, to generate the trained GAN model and to generate weights utilized to generate interpolated network data, as described below. In some implementations, the generation system may train the GAN model for a quantity of (e.g., one thousand, two thousand, three thousand, and/or the like) steps using a mini-batch gradient descent. In each epoch, the discriminator component of the GAN model may be trained five times, and the generator component of the GAN model may be trained once. The generator component may be updated based on feedback from the discriminator component. A loss of the generator component ($L_G$) (e.g., as per Equation 1) may be an expected value of the synthetic network data being equivalent to the real network data. A loss of the discriminator component ($L_D$) may be a Wasserstein distance between the real network data (X) and the synthetic network data (X) with a gradient penalty term as per Equation 2. Further details of training the GAN model are provided below in connection with FIGS. 1G and 1H.

Figure 1C:
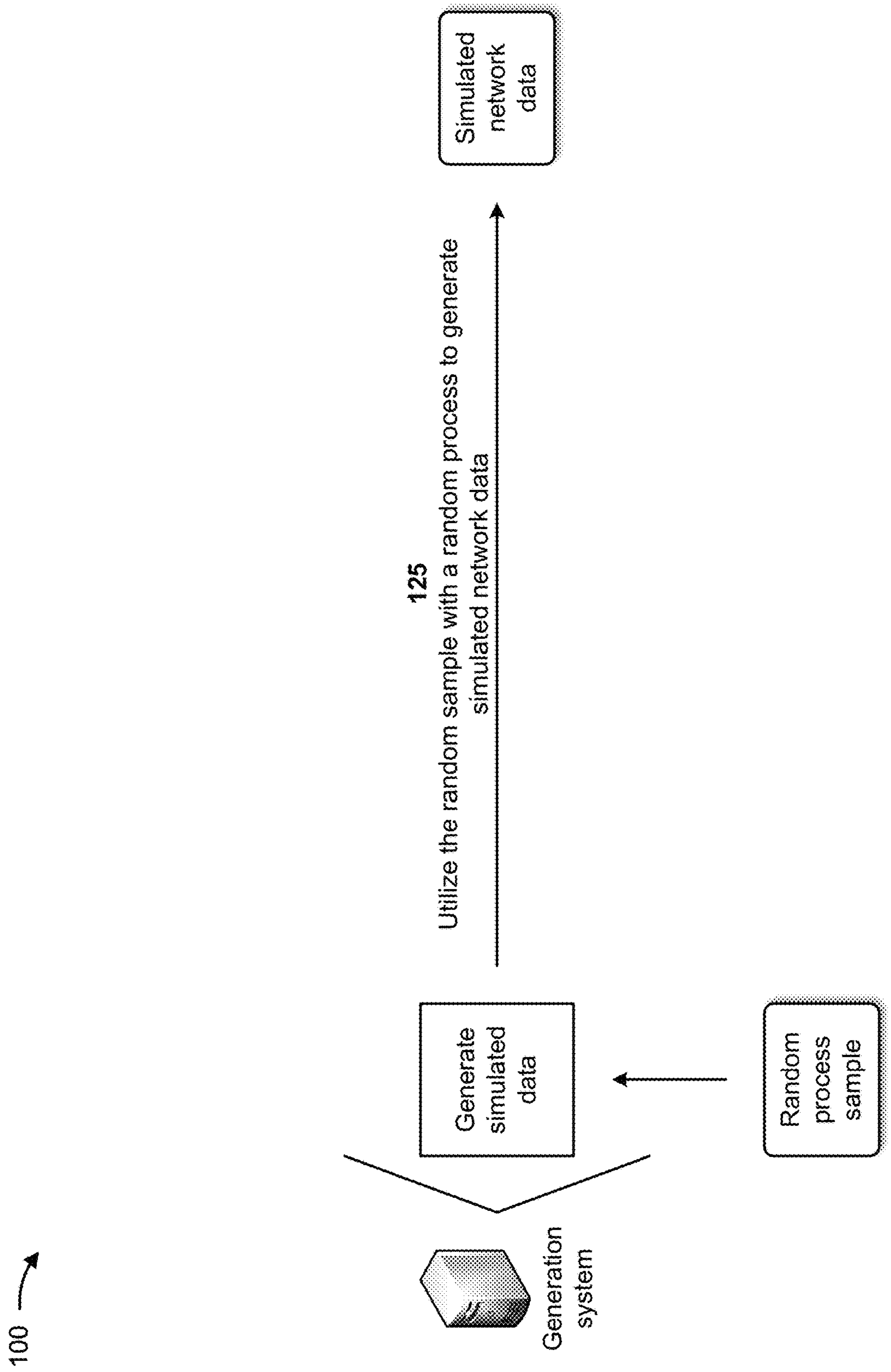

As shown in FIG. 1C, and by reference number 125, the generation system may utilize the random process sample with a random process to generate simulated network data. For example, the simulated network data may be application based, may be generated from a Poisson mathematical process, and may include network traffic trace data at one (sample/second) frequency. Network traffic throughput may include seasonality characteristics that are related to demand changes at different times during a day. The generation system may generate the simulated network data from a random (e.g., Poisson) process defining packet arrivals per second, where an arrival rate of packets during the daytime (e.g., 8:00 AM to 10:00 PM) may defined by the random process sample (e.g., a Poisson process variable of $\lambda_{day}=10$). To accommodate less network traffic at night, the Poisson process variable (λ) may be multiplied by a deactivation rate factor ($\omega_D$). As a result, the generation system may generate the simulated network data during the nighttime (e.g., 10:00 PM to 8:00 AM) from a random process defined by the random process sample (e.g., a Poisson process variable of $\lambda_{night}=2$). The resulting simulated network data ($X^P$) may be generated as a superposition of two Poisson distributions. Both of the Poisson process variables may be trained individually using a grid search on each attribute of the real network data for a lowest mean square error (MSE).

Figure 1D:
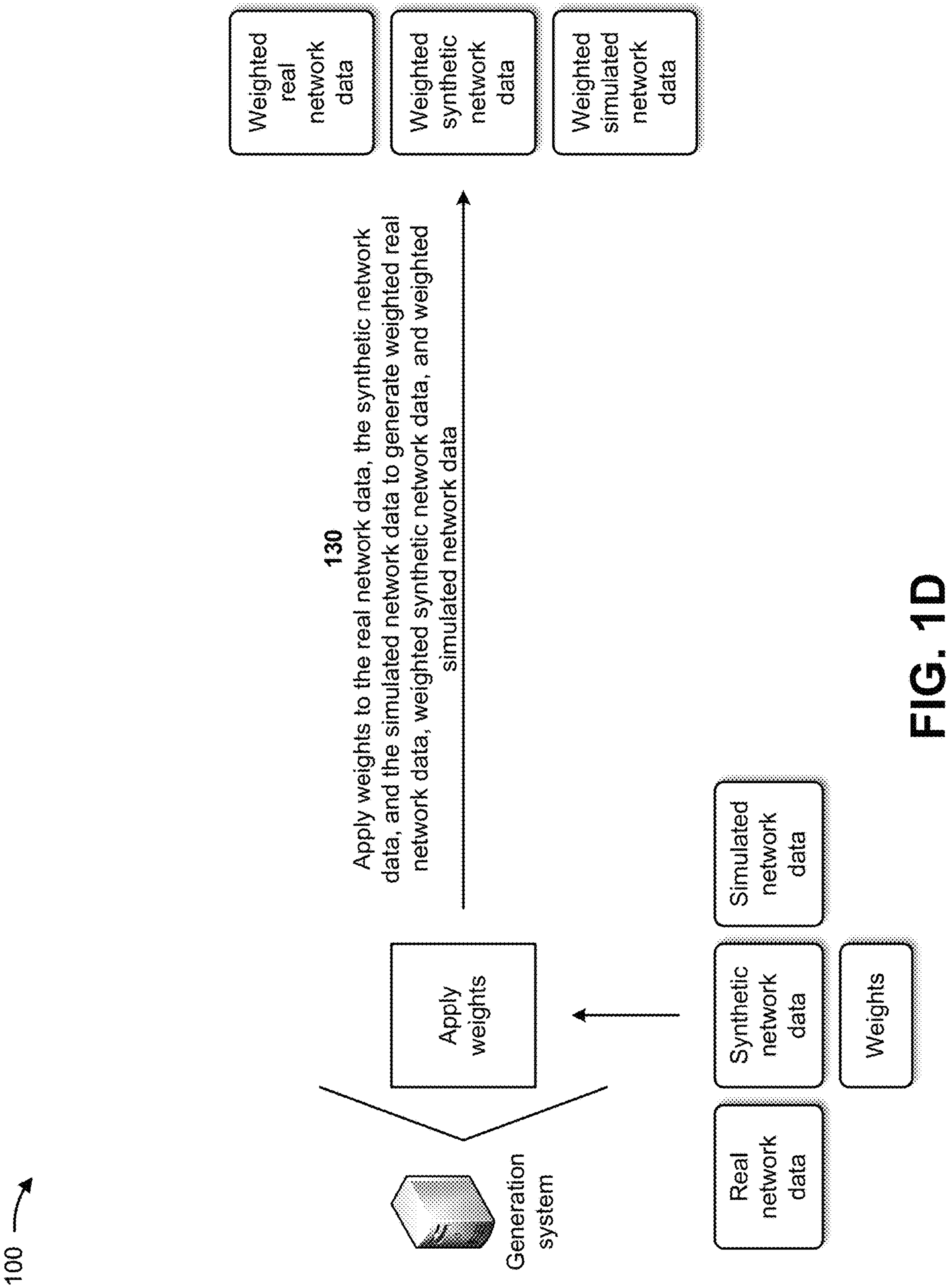

As shown in FIG. 1D, and by reference number 130, the generation system may apply weights to the real network data, the synthetic network data, and the simulated network data to generate weighted real network data, weighted synthetic network data, and weighted simulated network data. For example, the generation system may apply the weights generated based on training the GAN model with the real network data and the synthetic network data.

Alternatively, the generation system may determine different weights for each of the real network data, the synthetic network data, and the simulated network data. In some implementations, when applying the weights to the real network data, the synthetic network data, and the simulated network data to generate the weighted real network data, the weighted synthetic network data, and the weighted simulated network data, the generation system may apply a first weight ($w_1$) to the real network data to generate the weighted real network data. The generation system may apply a second weight (e.g., $w_2$ different than the first weight) to the synthetic network data to generate the weighted synthetic network data, and may apply a third weight (e.g., $w_3$ different than the first weight and the second weight) to the simulated network data to generate the weighted simulated network data. In some implementations, a sum of the first weight, the second weight, and the third weight may be equal to one. In some implementations, a value of the first weight may determine a quantity of the real network data that is masked.

Figure 1E:
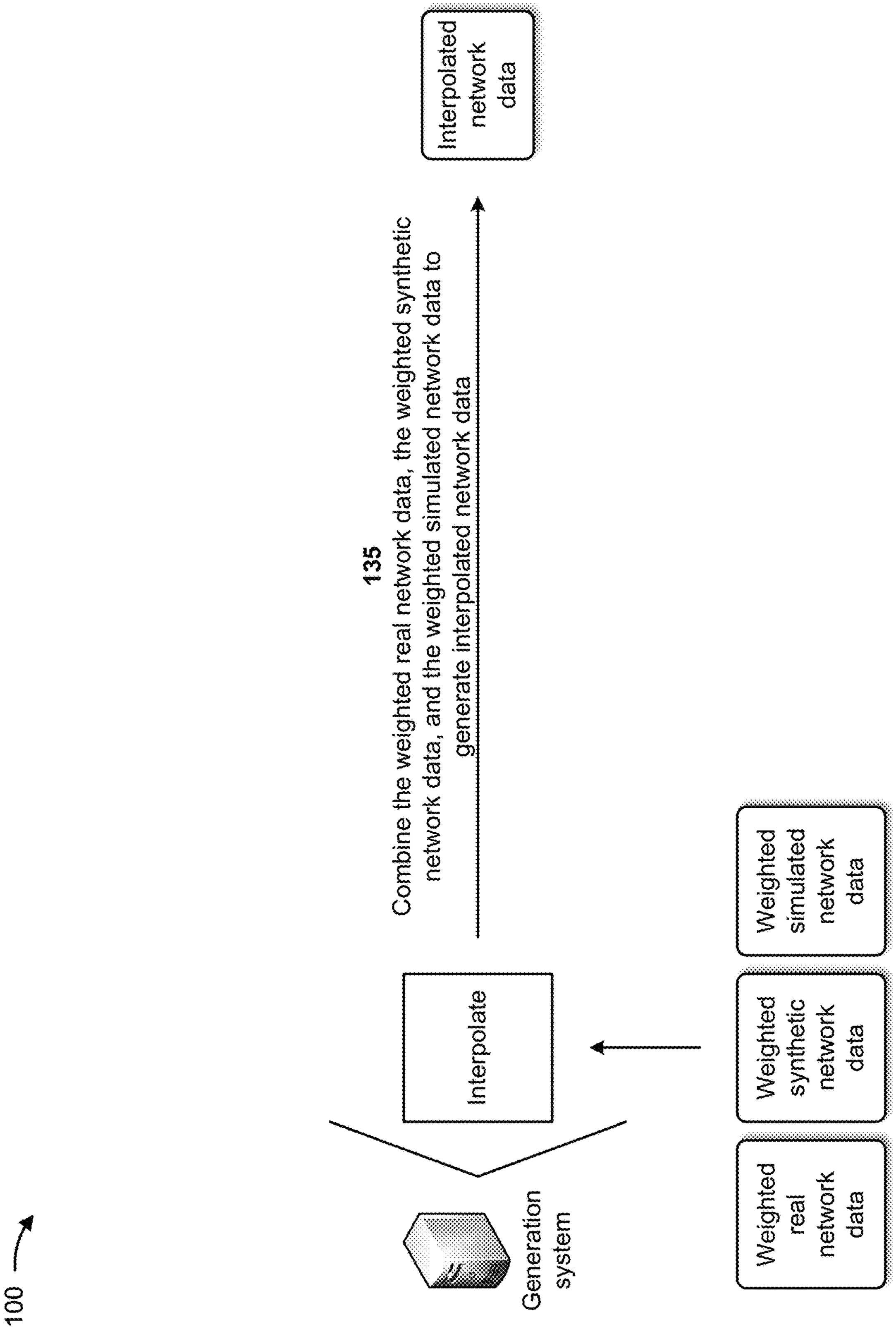

As shown in FIG. 1E, and by reference number 135, the generation system may combine the weighted real network data, the weighted synthetic network data, and the weighted simulated network data to generate interpolated network data. For example, the generation system may utilize the synthetic network data ($\tilde{X}$), the simulated network data ($X^p$), and a slight contribution from the real network data (X) to generate interpolated network data ($I(\lambda, z)$) that approximates network traffic of the network. The interpolated network data may be a weighted sum of the real network data, the synthetic network data, and the simulated network data (e.g., a sum of the weighted real network data, the weighted synthetic network data, and the weighted simulated network data). The generation system may utilize the random process to model user activity (e.g., by changing the variable λ). The generator component of the GAN model may model the time series (e.g., the network data) by learning an underlying pattern using the random latent vector. The second and third weights (e.g., $w_2$ and $w_3$) may control the weights of the synthetic network data and the simulated network data, respectively. Interpolated network data that resembles real network data may include a high value for the third weight. A contribution of the real network data (e.g., the first weight $w_1$) may be diluted to ensure sufficient masking of sensitive information in the interpolated network data. Equation 7 below may indicate a weighted combination of the real network data, the synthetic network data, and the simulated network data (e.g., the interpolated network data).

$$I(\lambda, z) = w_1 X + w_2 \tilde{X} + w_3 X^p \quad (7)$$

$$w_1 + w_2 + w_3 = 1 \quad (8)$$

Further details of generating the interpolated network data are provided below in connection with FIG. 1I.

Figure 1F:
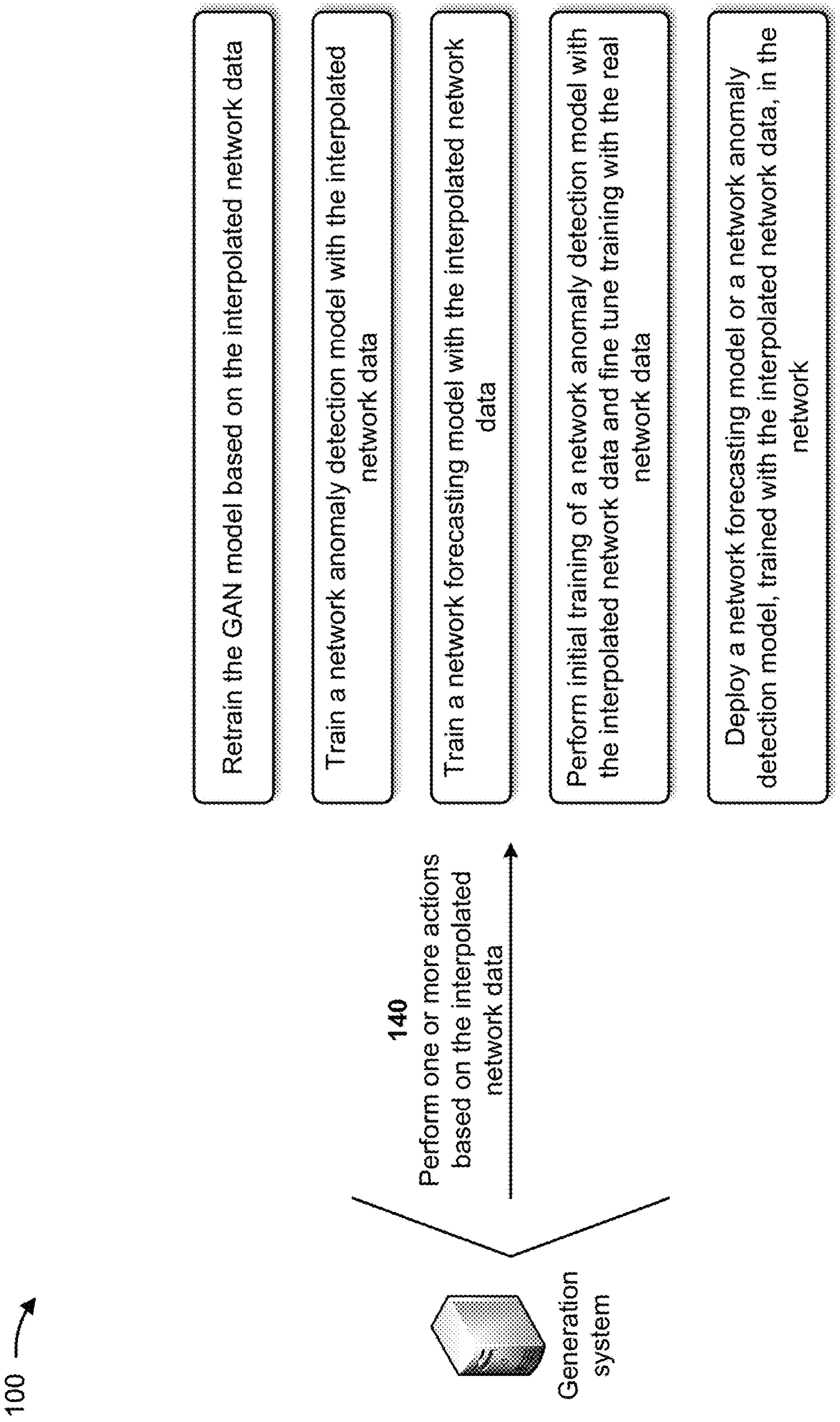

As shown in FIG. 1F, and by reference number 140, the generation system may perform one or more actions based on the interpolated network data. In some implementations, performing the one or more actions includes the generation system retraining the GAN model based on the interpolated network data. For example, the generation system may utilize the interpolated network data as additional training data for retraining the GAN model, thereby increasing the quantity of training data available for training the GAN model. Accordingly, the generation system may conserve computing resources associated with identifying, obtaining, and/or generating historical data for training the GAN model relative to other systems for identifying, obtaining, and/or generating historical data for training machine learning models.

In some implementations, performing the one or more actions includes the generation system training a network anomaly detection model with the interpolated network data. For example, since the interpolated network data is a weighted combination of the real network data, the simulated network data, and the synthetic network data, the generation system may utilize the interpolated network data for training a network anomaly detection model as per a change in user behavior by controlling the parameter (λ). The generation system may apply meta learning by performing initial training of the network anomaly detection model with the interpolated network data, and performing fine-tuning of the network anomaly detection model with the real network data. If an attribute has a few missing values or a feature is sparse, the generation system may utilize the interpolated network data to impute attribute values. In this way, the generation system may conserve computing resources, networking resources, and/or other resources that would have otherwise been consumed by failing to generate sufficient or quality training data for the machine learning models.

In some implementations, performing the one or more actions includes the generation system training a network forecasting model with the interpolated network data. For example, the generation system may train a network forecasting model with the interpolated network data to generate a trained network forecasting model that may be utilized for self-correcting network devices in networking applications. In this way, the generation system may conserve computing resources, networking resources, and/or other resources that would have otherwise been consumed by utilizing insufficient training data to train the machine learning models.

In some implementations, performing the one or more actions includes the generation system performing initial training of a network anomaly detection model with the interpolated network data and fine tune training the network anomaly detection model with the real network data. For example, the generation system may perform initial training of a network anomaly detection model with the interpolated network data, and may perform fine-tuning of the network anomaly detection model with the real network data. If an attribute has a few missing values or a feature is sparse, the generation system may utilize the interpolated network data to impute attribute values. In this way, the generation system may conserve computing resources, networking resources, and/or other resources that would have otherwise been consumed by generating erroneous machine learning models based on the insufficient training data.

In some implementations, performing the one or more actions includes the generation system deploying a network forecasting model or a network anomaly detection model, trained with the interpolated network data, in the network.

For example, the generation system may train a network forecasting model or a network anomaly detection model with the interpolated network data to generate a trained network forecasting model or a trained network anomaly detection model. The trained models may be utilized for self-correcting network devices in networking applications. In this way, the generation system may conserve computing resources, networking resources, and/or other resources that would have otherwise been consumed by generating erroneous outputs with the erroneous machine learning models.

Figure 1G:
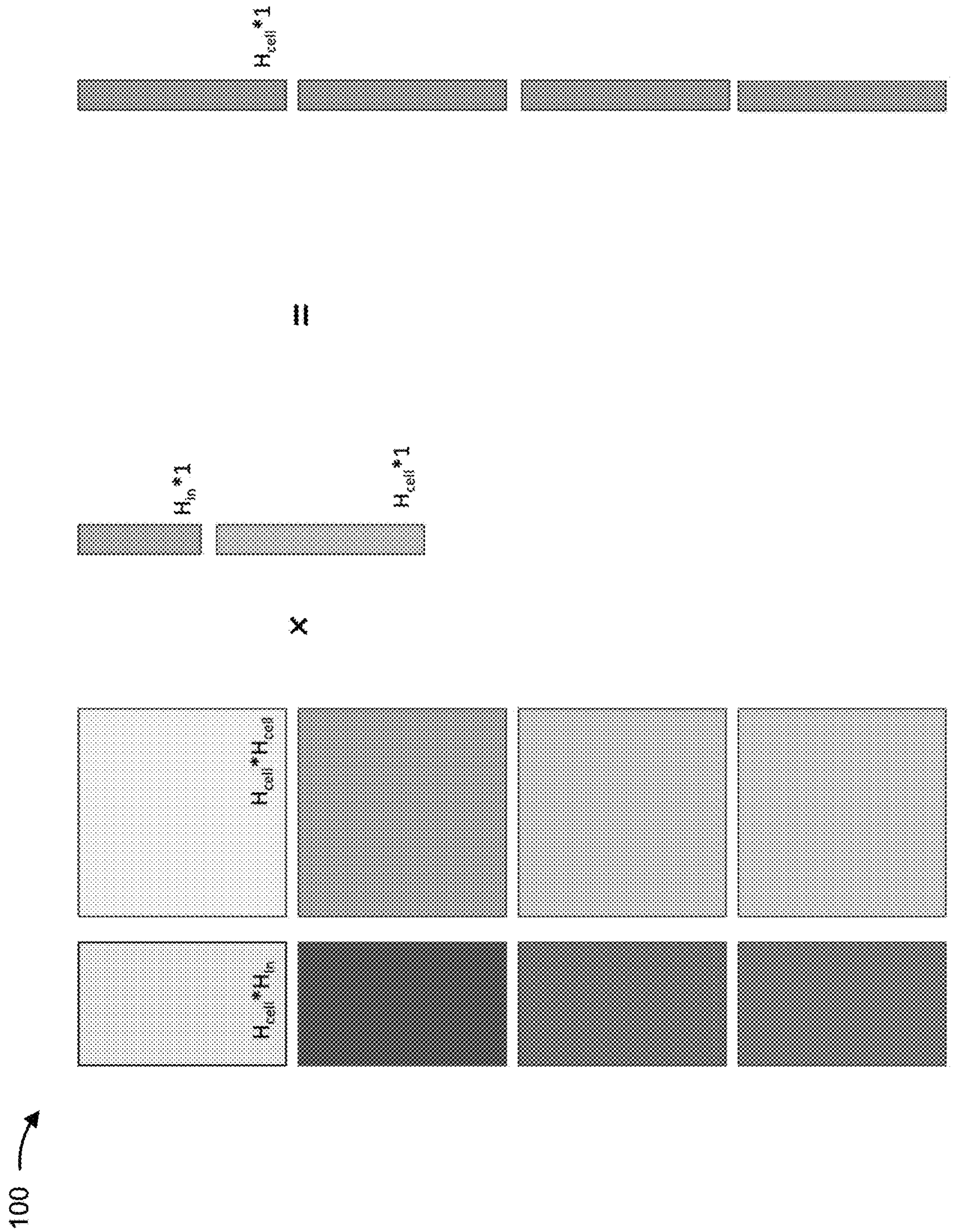

FIG. 1G is a diagram depicting an LSTM cell structure for a GAN model trained on individual features of a dataset. $H_{in}$ is one and $H_{cell}$ represents a hidden cell dimension. In FIG. 1G, the four layers represent gates of the LSTM cell, an input gate (i), an output gate (o) and a forget gate (f). Internally, the LSTM cell concatenates the weights associated with different gates into one matrix while training them. The weights are split into block matrices to show the transfer of the weights. The input gate is associated with two weight matrices (e.g., four layers). A first column of block matrices are the weight matrices of the LSTM cell associated with the input vector, and a second column of block matrices represents the weight matrices associated with a hidden vector. The bias vectors associated with the gates are not shown for simplicity. These univariate models have learned temporal dynamics of a feature on which they were trained. However, the n-generators are not synced and their phases are not aligned to incorporate the cross-correlation among multiple features.

Figure 1H:
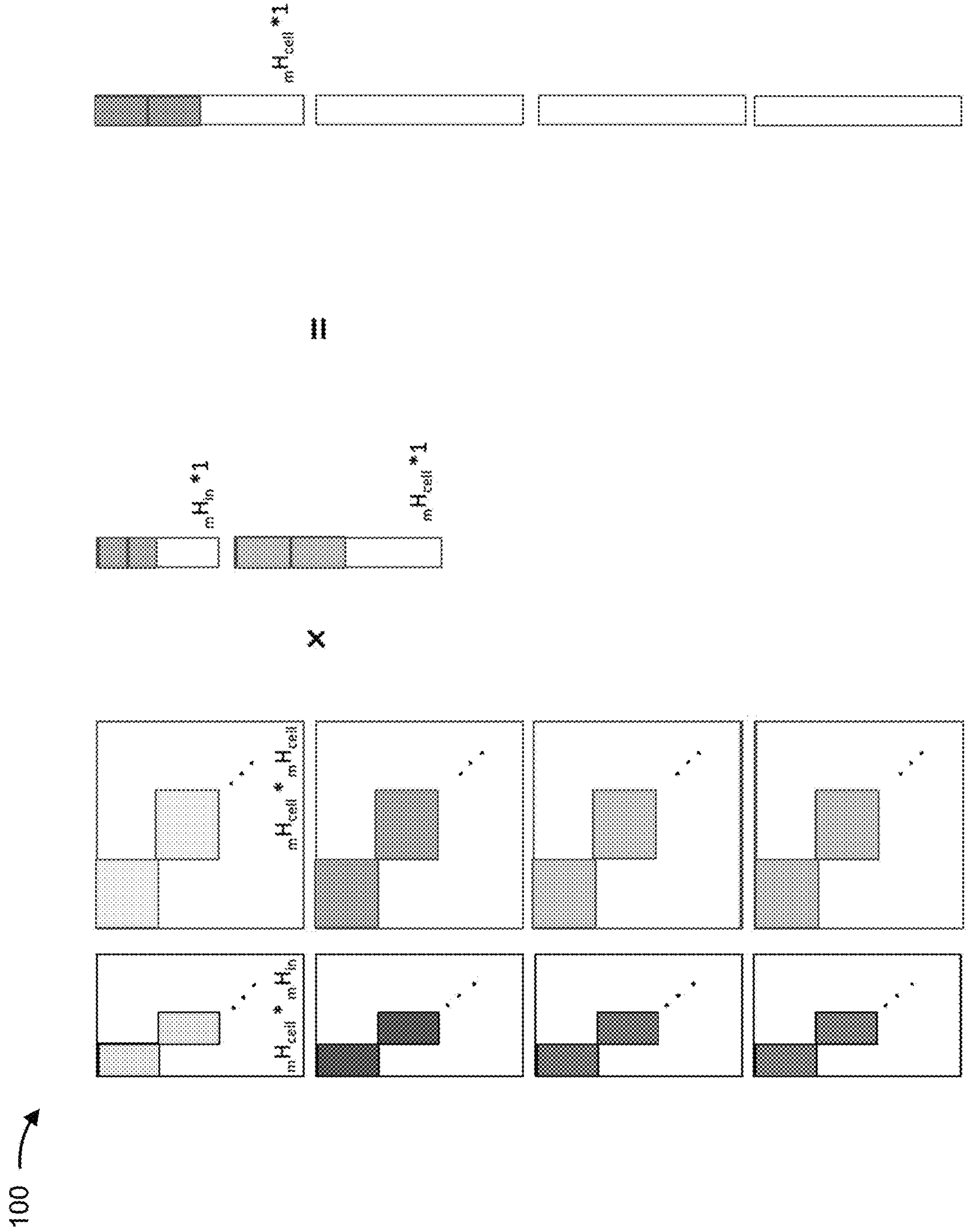

FIG. 1H is a diagram depicting an LSTM cell structure for a GAN model trained on a multi-feature dataset. ${}_mH_{in}$ is n where n is the number of features in the dataset and ${}_mH_{cell}$ represents a hidden cell dimension of the LSTM cell (e.g., ${}_mH_{cell}=n*H_{cell}$). FIG. 1H depicts training a multivariate GAN model with a similar generator and critic architecture whose weights are transferred learned weights of the individual models with the cross-correlation weights randomly assigned to be trained in later epochs. In the first layer (e.g., a layer with weights associated with the forget gate), there are weight matrices of the forget gate from the LSTM cell in n different univariate models placed diagonally and the rest of the entries are the ones associated with cross-correlation which will be learned later in training. The same logic follows for the remaining layers. The input vector is formed by concatenation of the input vector fed to n-univariate models. ${}_mH_{in}=n*H_{in}$ and ${}_mH_{cell}=n*H_{cell}$ for successful weights transfer, where n is the number of features in the dataset. The transfer of weights furthers the training process, makes the GAN model robust, and prevents mode collapse.

Figure 1I:
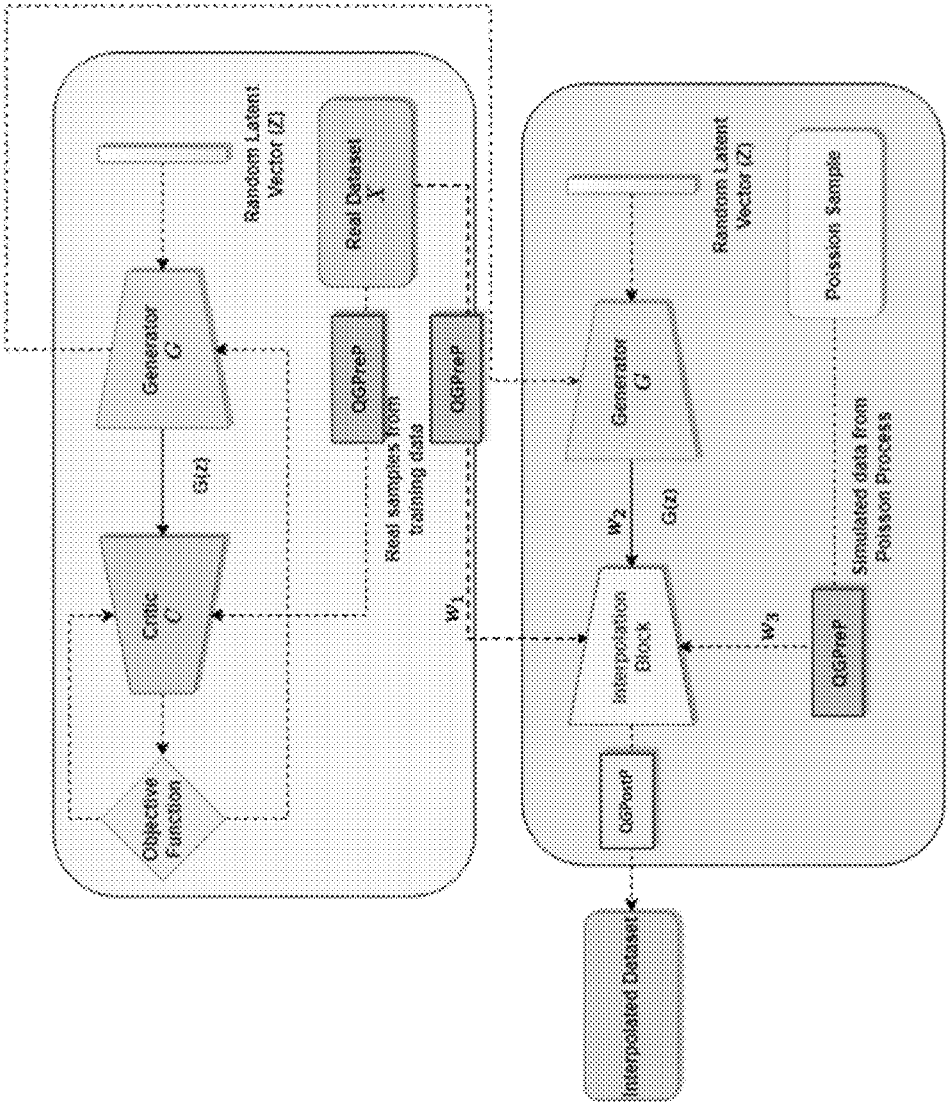

FIG. 1I is a diagram depicting a flowchart for generating the interpolated network data ($I(\lambda, z)$) using the synthetic network data ($\tilde{X}$), the simulated network data ($X^p$), and the real network data (X).

In this way, the generation system enhances the quality of simulated network data using generative adversarial networks. For example, the generation system may utilize GANs to augment real telemetry data collected from networks. The generation system may create a simulated rule-based time series dataset that matches an expected data distribution using a random process. The generation system may design and train a Wasserstein recurrent GAN for a multi-variate dataset (e.g., network data), with learned weights from pre-training on individual features which emulate respective feature temporal distributions and prevent mode collapse, on limited real network data to capture an underlying pattern. The generation system may design a training methodology for continuous, multivariate, streaming data generation which trains faster and converges better than existing models. The generation system may generate an interpolated dataset based on the real network data, simulated network data that captures a general trend of the real network data, and synthetic network data that provides high fidelity. Thus, the generation system may conserve computing resources, networking resources, and/or other resources that would have otherwise been consumed by failing to generate sufficient or quality training data for the machine learning models, utilizing insufficient training data to train the machine learning models, generating erroneous machine learning models based on the insufficient training data, generating erroneous outputs with the erroneous machine learning models, and/or the like.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
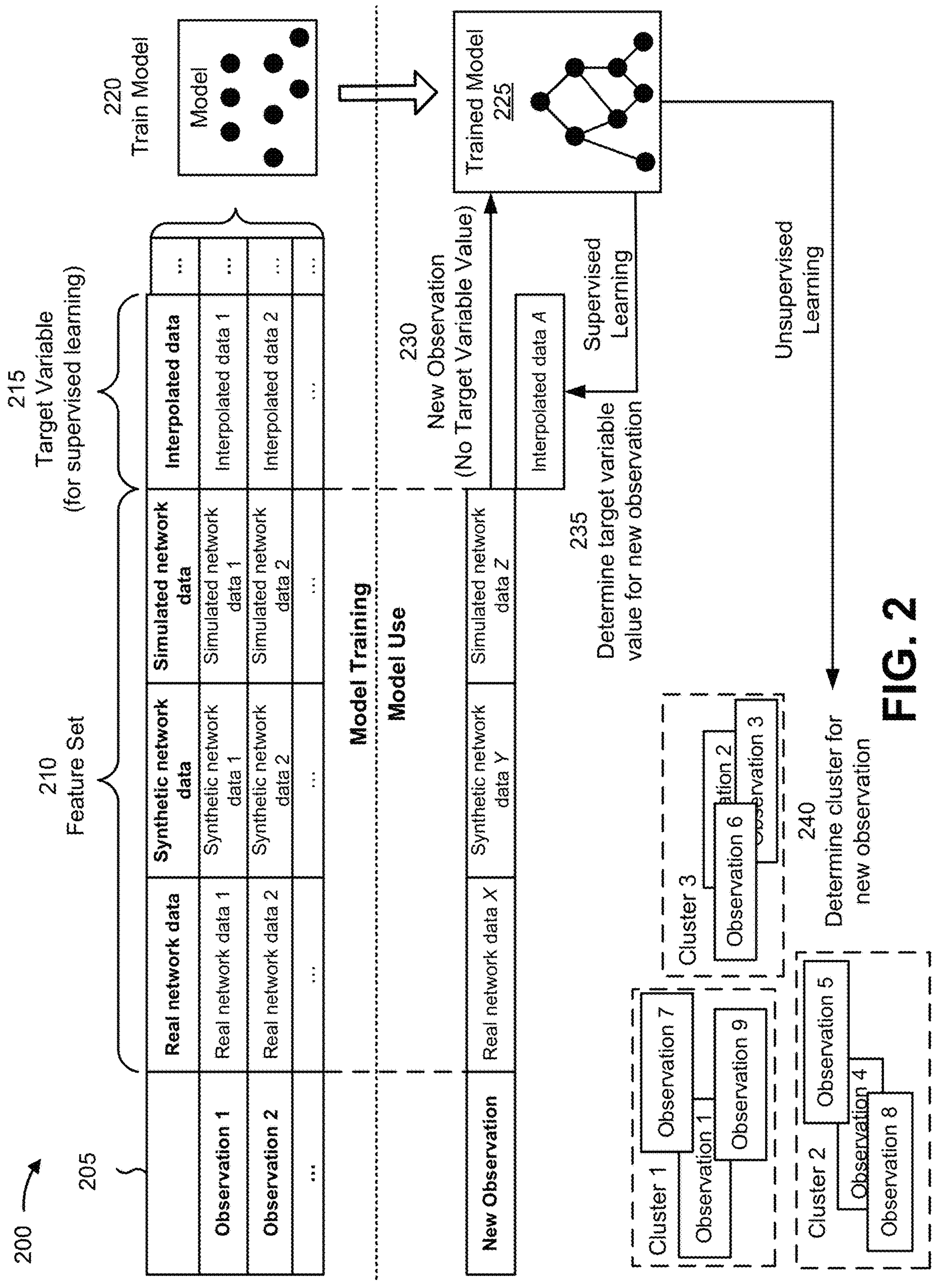
FIG. 2 is a diagram illustrating an example of training and using a machine learning model.

FIG. 2 is a diagram illustrating an example 200 of training and using a machine learning model. The machine learning model training and usage described herein may be performed using a machine learning system. The machine learning system may include or may be included in a computing device, a server, a cloud computing environment, or the like, such as the generation system.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the generation system, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the generation system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of real network data, a second feature of synthetic network data, a third feature of simulated network data, and so on. As shown, for a first observation, the first feature may have a value of real network data 1, the second feature may have a value of synthetic network data 1, the third feature may have a value of simulated network data 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is interpolated data, which has a value of interpolated data 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of real network data X, a second feature of synthetic network data Y, a third feature of simulated network data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of interpolated data A for the target variable of interpolated data for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a real network data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a synthetic network data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model).

In this way, the machine learning system may apply a rigorous and automated process to determine interpolated network data. The machine learning system may enable recognition and/or identification of tens, hundreds, thousands, or millions of features and/or feature values for tens, hundreds, thousands, or millions of observations, thereby increasing accuracy and consistency and reducing delay associated with determining interpolated network data relative to requiring computing resources to be allocated for tens, hundreds, or thousands of operators to manually determine interpolated network data using the features or feature values.

As indicated above, FIG. 2 is provided as an example. Other examples may differ from what is described in connection with FIG. 2.

Figure 3:
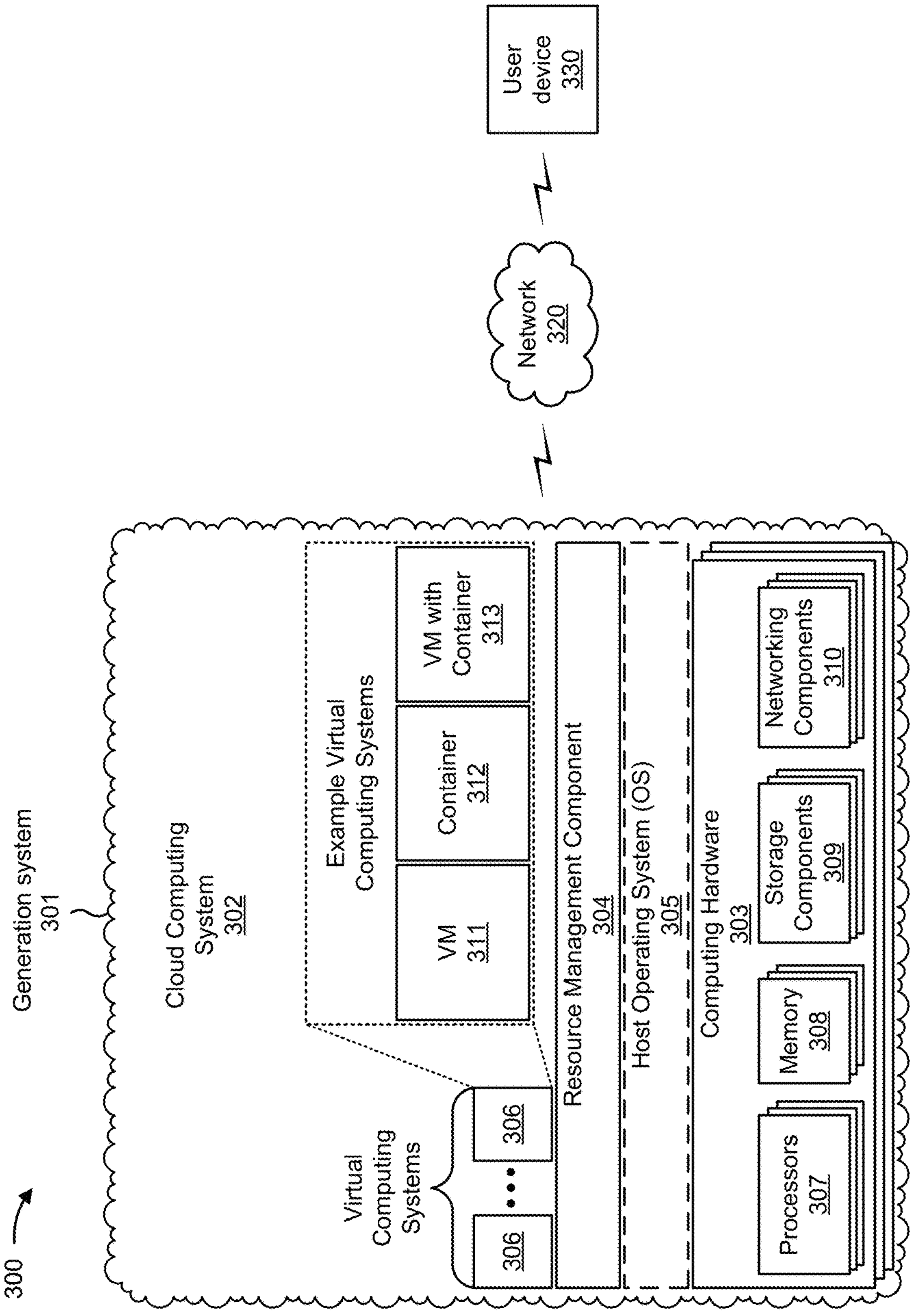
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include generation system 301, which may include one or more elements of and/or may execute within a cloud computing system 302. The cloud computing system 302 may include one or more elements 303-313, as described in more detail below. As further shown in FIG. 3, the environment 300 may include a network 320 and/or a user device 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the generation system 301 may include one or more elements 303-313 of the cloud computing system 302, may execute within the cloud computing system 302, and/or may be hosted within the cloud computing system 302, in some implementations, the generation system 301 may not be cloud-based (e.g., may be implemented outside of a cloud computing system) or may be partially cloud-based. For example, the generation system 301 may include one or more devices that are not part of the cloud computing system 302, such as a device 400 of FIG. 4, which may include a standalone server or another type of computing device. The generation system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The user device 330 may include one or more devices capable of receiving, generating, storing, processing, and/or providing information, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
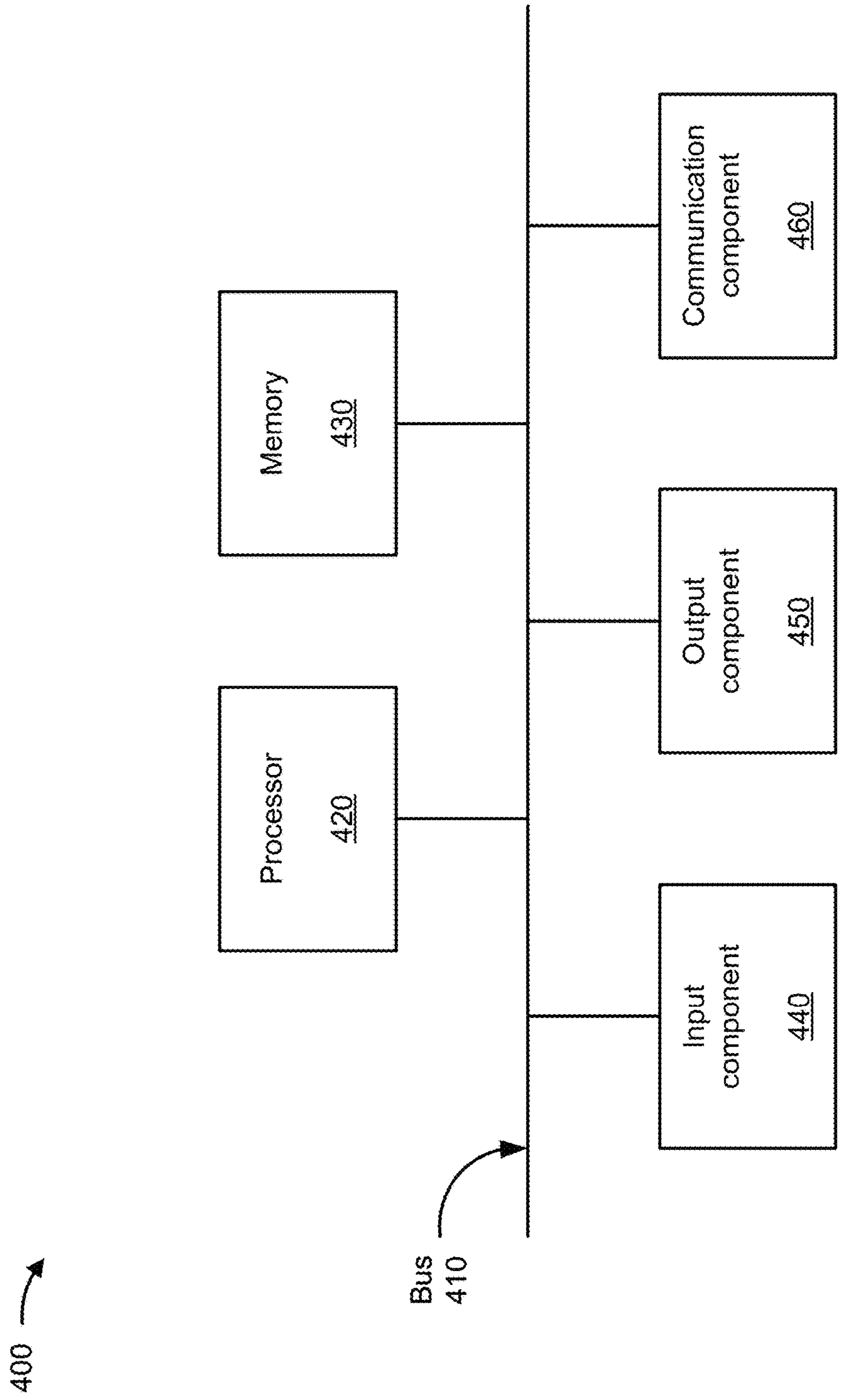
FIG. 4 is a diagram of example components of one or more devices of FIG. 3.

FIG. 4 is a diagram of example components of a device 400, which may correspond to the generation system 301 and/or the user device 330. In some implementations, the generation system 301 and/or the user device 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
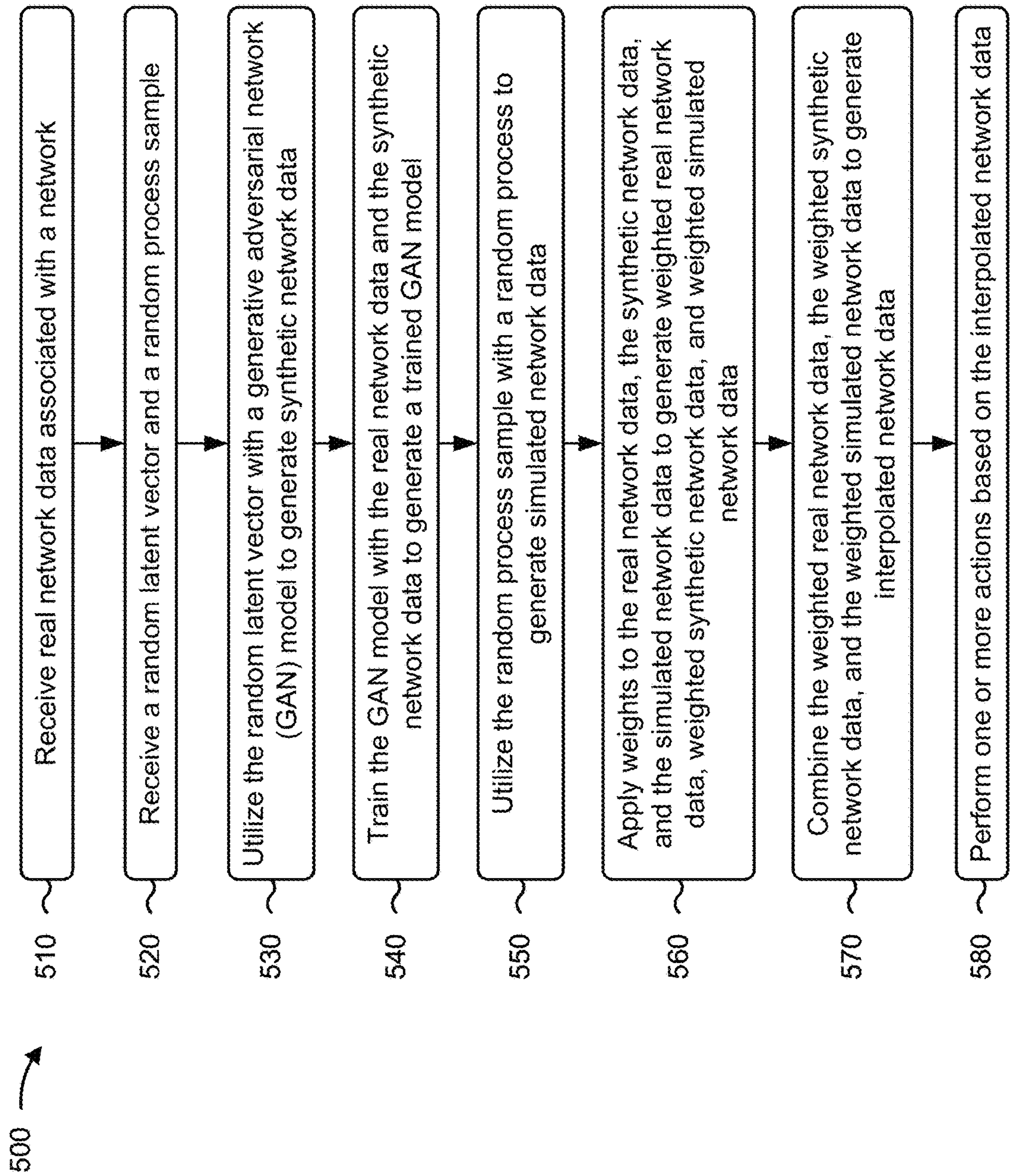
FIG. 5 is a flowchart of an example process for enhancing the quality of simulated network data using generative adversarial networks.

FIG. 5 depicts a flowchart of an example process 500 for enhancing the quality of simulated network data using generative adversarial networks. In some implementations, one or more process blocks of FIG. 5 may be performed by a device (e.g., the generation system 301). In some implementations, one or more process blocks of FIG. 5 may be performed by another device or a group of devices separate from or including the device. Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving real network data associated with a network (block 510). For example, the device may receive real network data associated with a network, as described above. In some implementations, the real network data includes a multivariate dataset.

As further shown in FIG. 5, process 500 may include receiving a random latent vector and a random process sample (block 520). For example, the device may receive a random latent vector and a random process sample, as described above.

As further shown in FIG. 5, process 500 may include utilizing the random latent vector with a GAN model to generate synthetic network data (block 530). For example, the device may utilize the random latent vector with a GAN model to generate synthetic network data, as described above. In some implementations, the GAN model is a Wasserstein recurrent GAN model. In some implementations, the GAN model includes a generator component and a discriminator component.

As further shown in FIG. 5, process 500 may include training the GAN model with the real network data and the synthetic network data to generate a trained GAN model (block 540). For example, the device may train the GAN model with the real network data and the synthetic network data to generate a trained GAN model, as described above. In some implementations, training the GAN model with the real network data and the synthetic network data to generate the trained GAN model includes training the GAN model with the real network data and the synthetic network data to generate the weights.

As further shown in FIG. 5, process 500 may include utilizing the random process sample with a random process to generate simulated network data (block 550). For example, the device may utilize the random process sample with a random process to generate simulated network data, as described above. In some implementations, utilizing the random process sample with the random process to generate the simulated network data includes utilizing the random process sample and the real network data to generate two Poisson distributions, and superposing the two Poisson distributions to generate the simulated network data.

As further shown in FIG. 5, process 500 may include applying weights to the real network data, the synthetic network data, and the simulated network data to generate weighted real network data, weighted synthetic network data, and weighted simulated network data (block 560). For example, the device may apply weights to the real network data, the synthetic network data, and the simulated network data to generate weighted real network data, weighted synthetic network data, and weighted simulated network data, as described above. In some implementations, applying the weights to the real network data, the synthetic network data, and the simulated network data to generate the weighted real network data, the weighted synthetic network data, and the weighted simulated network data includes applying a first weight to the real network data to generate the weighted real network data, applying a second weight to the synthetic network data to generate the weighted synthetic network data, and applying a third weight to the simulated network data to generate the weighted simulated network data, wherein a sum of the first weight, the second weight, and the third weight is equal to one. In some implementations, a value of the first weight determines a quantity of the real network data that is masked.

As further shown in FIG. 5, process 500 may include combining the weighted real network data, the weighted synthetic network data, and the weighted simulated network data to generate interpolated network data (block 570). For example, the device may combine the weighted real network data, the weighted synthetic network data, and the weighted simulated network data to generate interpolated network data, as described above.

As further shown in FIG. 5, process 500 may include performing one or more actions based on the interpolated network data (block 580). For example, the device may perform one or more actions based on the interpolated network data, as described above. In some implementations, performing the one or more actions includes one or more of providing the interpolated network data for display, or retraining the GAN model based on the interpolated network data. In some implementations, performing the one or more actions includes one or more of training a network anomaly detection model with the interpolated network data, or training a network forecasting model with the interpolated network data.

In some implementations, performing the one or more actions includes performing initial training of a network anomaly detection model with the interpolated network data, and performing fine tune training of the network anomaly detection model with the real network data. In some implementations, performing the one or more actions includes deploying a network forecasting model or a network anomaly detection model, trained with the interpolated network data, in the network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, real network data associated with a network;

receiving, by the device, a random latent vector and a random process sample;

utilizing, by the device, the random latent vector with a generative adversarial network (GAN) model to generate synthetic network data;

training, by the device, the GAN model with the real network data and the synthetic network data to generate a trained GAN model;

utilizing, by the device, the random process sample with a random process to generate simulated network data, wherein the simulated data network includes network traffic data at one frequency;

applying, by the device and based on the trained GAN model, weights to the real network data, the synthetic network data, and the simulated network data to generate weighted real network data, weighted synthetic network data, and weighted simulated network data;

combining, by the device, the weighted real network data, the weighted synthetic network data, and the weighted simulated network data to generate interpolated network data; and performing, by the device, one or more actions based on the interpolated network data.

2. The method of claim 1, wherein the real network data includes a multivariate dataset.

3. The method of claim 1, wherein the GAN model is a Wasserstein recurrent GAN model.

4. The method of claim 1, wherein training the GAN model with the real network data and the synthetic network data to generate the trained GAN model comprises:

training the GAN model with the real network data and the synthetic network data to generate the weights.

5. The method of claim 1, wherein applying the weights to the real network data, the synthetic network data, and the simulated network data to generate the weighted real network data, the weighted synthetic network data, and the weighted simulated network data comprises:

applying a first weight to the real network data to generate the weighted real network data;

applying a second weight to the synthetic network data to generate the weighted synthetic network data; and applying a third weight to the simulated network data to generate the weighted simulated network data, wherein a sum of the first weight, the second weight, and the third weight is equal to one.

6. The method of claim 5, wherein a value of the first weight determines a masked quantity of the real network data.

7. The method of claim 1, wherein utilizing the random process sample with the random process to generate the simulated network data comprises:

utilizing the random process sample and the real network data to generate two Poisson distributions; and superposing the two Poisson distributions to generate the simulated network data.

8. A device, comprising:

one or more memories; and one or more processors to:

receive real network data associated with a network, wherein the real network data include a multivariate dataset, wherein the multivariate dataset set includes multivariate temporal behavior of network traffic throughput;

receive a random latent vector and a random process sample;

utilize the random latent vector with a generative adversarial network (GAN) model to generate synthetic network data;

train the GAN model with the real network data and the synthetic network data to generate a trained GAN model;

utilize the random process sample with a random process to generate simulated network data;

apply weights to the real network data, the synthetic network data, and the simulated network data to generate weighted real network data, weighted synthetic network data, and weighted simulated network data;

combine the weighted real network data, the weighted synthetic network data, and the weighted simulated network data to generate interpolated network data; and perform one or more actions based on the interpolated network data.

9. The device of claim 8, wherein the one or more processors, to utilize the random process sample with the random process to generate the simulated network data, are to:

utilize the random process sample and the real network data to generate two Poisson distributions; and superpose the two Poisson distributions to generate the simulated network data.

10. The device of claim 8, wherein the GAN model includes a generator component and a discriminator component.

11. The device of claim 8, wherein the one or more processors, to perform the one or more actions, are to one or more of:

provide the interpolated network data for display; or retrain the GAN model based on the interpolated network data.

12. The device of claim 8, wherein the one or more processors, to perform the one or more actions, are to one or more of:

train a network anomaly detection model with the interpolated network data; or train a network forecasting model with the interpolated network data.

13. The device of claim 8, wherein the one or more processors, to perform the one or more actions, are to:

perform initial training of a network anomaly detection model with the interpolated network data; and perform fine tune training of the network anomaly detection model with the real network data.

14. The device of claim 8, wherein the one or more processors, to perform the one or more actions, are to:

deploy a network forecasting model or a network anomaly detection model, trained with the interpolated network data, in the network.

15. A non-transitory computer-readable medium storing a set of instructions, the set of instructions comprising:

one or more instructions that, when executed by one or more processors of a device, cause the device to:

receive real network data associated with a network;

receive a random latent vector and a random process sample;

utilize the random latent vector with a generative adversarial network (GAN) model to generate synthetic network data, wherein the GAN model is a Wasserstein recurrent GAN model;

train the GAN model with the real network data and the synthetic network data to generate a trained GAN model;

utilize the random process sample with a random process to generate simulated network data, wherein the simulated data network includes network traffic data at one frequency;

apply, based on the trained GAN, weights to the real network data, the synthetic network data, and the simulated network data to generate weighted real network data, weighted synthetic network data, and weighted simulated network data;

combine the weighted real network data, the weighted synthetic network data, and the weighted simulated network data to generate interpolated network data; and perform one or more actions based on the interpolated network data.

16. The non-transitory computer-readable medium of claim 15, wherein the one or more instructions, that cause the device to train the GAN model with the real network data and the synthetic network data to generate the trained GAN model, cause the device to:

train the GAN model with the real network data and the synthetic network data to generate the weights.

17. The non-transitory computer-readable medium of claim 15, wherein the one or more instructions, that cause the device to apply the weights to the real network data, the synthetic network data, and the simulated network data to generate the weighted real network data, the weighted synthetic network data, and the weighted simulated network data, cause the device to:

apply a first weight to the real network data to generate the weighted real network data;

apply a second weight to the synthetic network data to generate the weighted synthetic network data; and apply a third weight to the simulated network data to generate the weighted simulated network data, wherein a sum of the first weight, the second weight, and the third weight is equal to one.

18. The non-transitory computer-readable medium of claim 17, wherein a value of the first weight determines a masked quantity of the real network data.

19. The non-transitory computer-readable medium of claim 15, wherein the one or more instructions, that cause the device to utilize the random process sample with the random process to generate the simulated network data, cause the device to:

utilize the random process sample and the real network data to generate two Poisson distributions; and superpose the two Poisson distributions to generate the simulated network data.

20. The non-transitory computer-readable medium of claim 15, wherein the GAN model includes a generator component and a discriminator component.

* * * * *